Patented Nov. 25, 1941

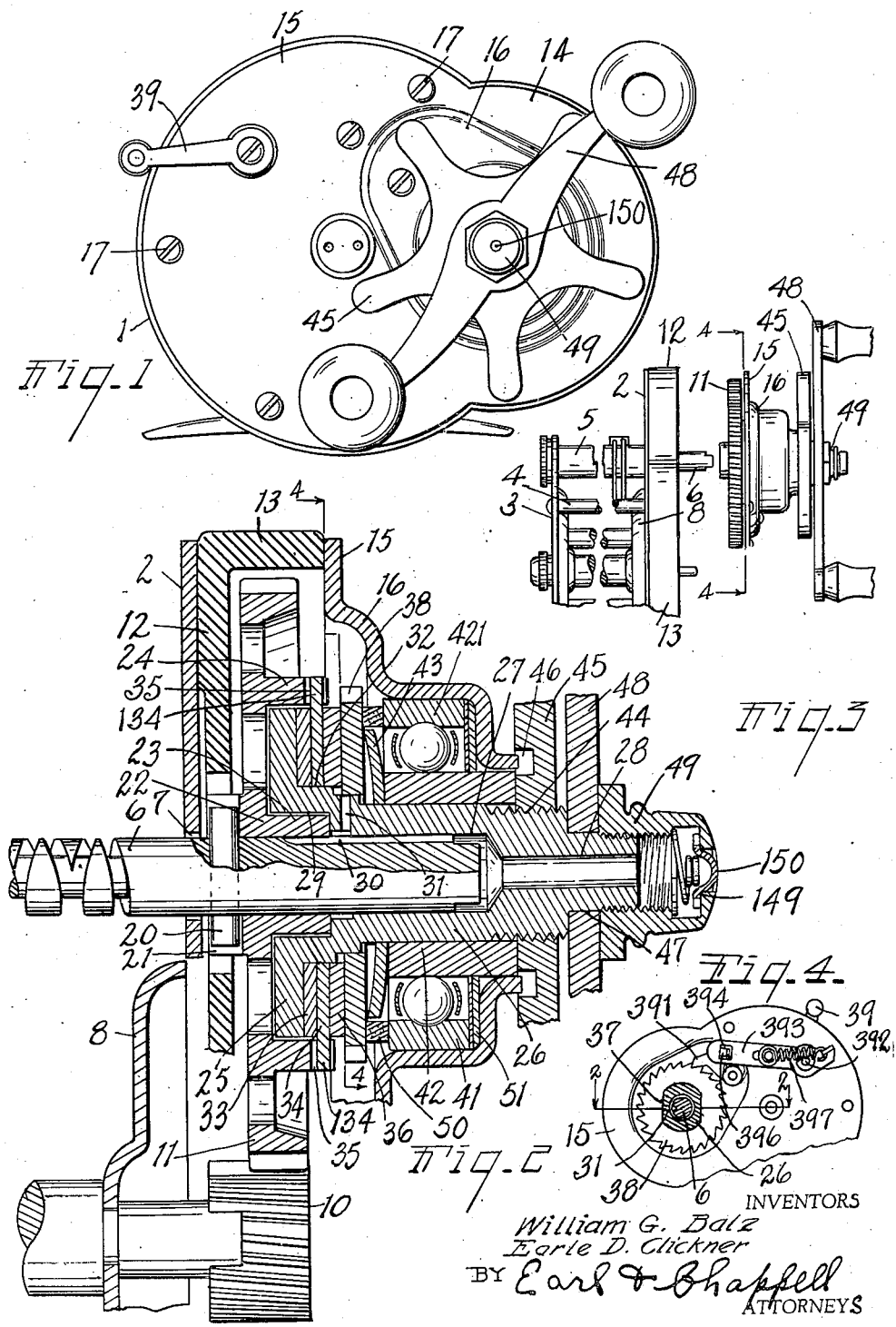

2,263,836

UNITED STATES PATENT OFFICE 2,263,836

FISHING REEL

William G. Balz and Earle D. Clickner, Kalamazoo, Mich., assignors to Shakespeare Company, Kalamazoo, Mich., a corporation of Michigan Application September 16, 1939, Serial No. 295,174

10 Claims. (Cl. 242—84.4)

This invention relates to improvements in fishing reels.

The main objects of this invention are:

First, to provide a fishing reel having a friction drive and drag mechanism which may be readily and quickly adjusted to secure the desired drag.

Second, to provide a mechanism of this character which while having a wide range of drag varying adjustment is compact and may be operated in reels of relatively small dimension.

Third, to provide a mechanism of the class described including a bearing means for the crank shaft which bearing means constitutes a part of the adjusting mechanism.

Fourth, to provide a structure having these advantages which is comparatively simple and economical in the matter of parts and in the assembling and disassembling thereof.

Objects relating to details and economies of the invention will appear from the description to follow. The invention is defined and pointed out in the claims.

A preferred embodiment of the invention is illustrated in the accompanying drawing, in which:

Fig. 1 is a head end elevation of a fishing reel embodying the features of the invention.

Fig. 2 is an enlarged fragmentary view mainly in longitudinal section on a line corresponding to line 2—2 of Fig. 4, showing in considerable detail the clutch mechanism of the invention.

Fig. 3 is a fragmentary diagrammatic view illustrating the manner in which parts of the mechanism can be disassembled for cleaning and the like.

Fig. 4 is a fragmentary view sectioned on line 4—4 of Fig. 2 showing details of the drag setting means.

In fishing reels designed for use in sea fishing and fishing for large fish generally, it is frequently desired to provide brake or drag means which relieves the fisherman of the effort of holding the fish by means of the crank, at the same time it being desirable to have a mechanism which permits winding-in operation at any time. The amount of drag should be variable in accordance with the strength of the line and other fishing conditions. This invention relates to these advantages and others which have been stated in the foregoing objects and which will appear from the following description.

In the embodiment of our invention illustrated in the accompanying drawing, we provide a frame designated generally by the numeral 1 and which consists of head and tail plates 2 and 3 connected by suitable pillars 4.

The embodiment of our invention illustrated is a level wind type of reel, the level wind mechanism being generally designated by the numeral 5 and comprises a reversely threaded line guide carriage traversing shaft 6 which extends through an opening 7 in the head plate 2. The spool designated generally by the numeral 8 is provided with a pinion 10 meshing with the driving gear 11.

The frame is provided with a gear box or housing comprising the plate 12 preferably formed of suitable plastic or moldable material and having a peripheral outturned flange 13. It will be noted that the head plate and this housing plate 12 have a side enlargement 14 for accommodating the gearing and drive mechanism.

The outer cap or gear housing plate 15 is similarly shaped and is provided with an integral enlargement or bulge portion 16 to accommodate certain of the parts as will be clear as the description proceeds. These parts 2, 12 and 15 are secured together by means of screws 17 which threadingly engage the pillars 4.

As is clearly shown in Fig. 2, the traversing shaft 6 extends into the housing or gear box and receives the driving gear 11. This driving gear is non-rotatably secured to the shaft as by means of the pin 20 which engages the radial slot 21 in the hub 22 of the gear. This hub is extended axially in the opposite direction 23 and has an axially extending flange 24 intermediate its periphery and the hub.

The flange 24 is spaced from the hub sufficiently to receive the flange 25 on the driving shaft 26, this flange constituting a thrust member for the friction clutch means to be described. This driving shaft has an axial bore 27 receiving the end of the traversing shaft 6 and a reduced extension 28 of said bore which constitutes an oil passage. The bore of the driving shaft is stepped or counterbored at 29 so that the flange 22 on the gear wheel projects into the inner end of the driving shaft.

The traversing shaft 6 has a longitudinal groove 30 to provide an oil passage, this communicating with a radial oil passage 31 in the driving shaft so that the parts may be effectively lubricated. The lubricant is introduced through an opening 149 in the cap 49, the opening being provided with a spring pressed closure 150.

The driving shaft 26 is provided with an enlarged portion 32 adjacent its thrust flange 25 on which are rotatably and slidingly mounted a friction disk 33 in supported engagement or coacting relation with the thrust flange 25, a driving disk 34 having radial projections or lugs 134 engageable in recesses 35 on the gear flange 24, a second friction disk 36 and the ratchet wheel 38 which constitutes a friction clutch element and is splined to the driving shaft for rotation therewith, the shaft being partially cut away at 37 to provide splined driving engagement for the ratchet wheel and shaft.

The shaft is rotatably supported in the housing by means of a ball bearing designated generally by the numeral 41 and comprising an inner race member 42 which, it will be observed, has no ball groove or track that would inhibit axial movement of the member 42 on the shaft and relative to the outer race bearing member 421 which is fixed within the housing. The member 42 is in end thrust engagement with the concavo-convex spring disk 43 disposed between it and the ratchet wheel 38.

The driving shaft is externally threaded at 44 to receive the star-type adjusting wheel or nut 45 which is in thrust engagement with the bearing member 42. The member 45 has an annular groove 46 accommodating the end of the housing enlargement 16 so that the latter may telescope in the recess as the member 45 is axially adjusted on the driving shaft. The driving shaft has a reduced portion 47 receiving the crank 48 which is clamped upon the shaft by means of the nut 49.

We preferably provide a packing ring or gasket 50 disposed between the ratchet wheel and the outer bearing race; also suitable packings shown at 51 are provided for the outer end of the bearing.

In operation, turning of the adjusting member 45 in or out increases and diminishes the axial thrust on the friction clutch and hence increases or decreases the driving and braking or drag friction of the clutch.

To relieve the operator of the necessity for holding the crank against the pull of a fish, we provide a manually controlled pawl 391 which coacts with the ratchet wheel 38 when in engaged position as shown in Fig. 4. This pawl is thrown into and out of engaging position by means of the lever 39 which is pivoted at 392 and connected to the pawl by the link or arm 393 which has an opening 394 therein engaging a lug 396 on the pawl. A spring 397 holds the lever in its adjusted positions. The connection described allows the pawl to operate in ratcheting relation when it is in the position shown in Fig. 4 but it may be thrown out of operative relation to the ratchet wheel so that the reel is entirely manipulated from the crank.

The ratchet connection permits the crank being operated to wind in line even when the pawl is in operative position but the crank is relieved of a load when the line is drawn out with the pawl in engaging position. In other words, the crank is stationary while the line may be unwound against the drag or load of the friction driving connection.

This arrangement of parts enables the production of a very simple and compact structure and one in which the load on the parts is well distributed so that they are subjected to a minimum of strain.

In Fig. 3 we illustrate the simplified manner of removing the above described driving mechanism for cleaning, etc. It is only necessary to remove the end plate 15, whereupon all of the parts associated with the gear 11 and shaft 26 may be slid off the traversing shaft 6 without disturbing their relation one to the other. If desired, the traversing shaft may be then simply lifted from its tail plate bearing, whereupon the reversing line guide carriage may be easily removed from the traversing shaft.

We have illustrated and described our improvements in an embodiment which is very practical. We have not attempted to illustrate or describe other embodiments or adaptations as it is believed this disclosure will enable those skilled in the art to embody or adapt our improvements as may be desired.

Having thus described our invention, what we claim as new and desire to secure by Letters Patent, is:

1. The combination in a fishing reel including a frame, a spool provided with a pinion and a line guide traversing shaft, of a driving gear mounted on said traversing shaft in angularly fixed relation thereto and coacting with said pinion, a driving shaft provided with a crank and having an axial bore receiving the end of said traversing shaft and having a projecting externally threaded outer portion at the inner side of its crank, an anti-friction bearing for said driving shaft including an inner race member slidable axially on said driving shaft, a friction clutch connection for said driving shaft to said driving gear including a thrust member at the inner end of said driving shaft, a ratchet member splined to said driving shaft and constituting an opposed thrust member, a driven clutch member having driving engagement with said gear, friction disks coacting with said thrust members and with said driven clutch member, a dished spring element arranged at the outer side of said ratchet member in operative thrust transmitting relation thereto and to said inner ball race member, a manually controlled pawl coacting with said ratchet member, and a clutch adjusting member threaded upon said driving shaft in operative thrust transmitting relation to said inner ball race member to adjust the friction of said clutch connection.

The combination in a fishing reel including a frame, a spool provided with a pinion and a line guide traversing shaft, of a driving gear mounted on said traversing shaft in angularly fixed relation thereto and coacting with said pinion, a driving shaft provided with a crank and having an axial bore receiving the end of said traversing shaft and having a projecting externally threaded outer portion at the inner side of its crank, an anti-friction bearing for said driving shaft including an inner race member slidable axially on said driving shaft, a friction clutch connection for said driving shaft to said driving gear in thrust transmitting relation to said race member including a thrust member at the inner end of said driving shaft, a ratchet member splined to said driving shaft and constituting an opposed thrust member, a driven clutch member having driving engagement with said gear, friction disks coacting with said thrust members and with said driven clutch member, a manually controlled pawl coacting with said ratchet member, and a clutch adjusting member threaded upon said driving shaft in operative thrust transmitting relation to said inner ball race member to adjust the friction of said clutch connection.

3. The combination in a fishing reel including a frame, a spool provided with a pinion and a line guide traversing shaft, of a driving gear mounted on said traversing shaft in angularly fixed relation thereto and coacting with said pinion, a driving shaft provided with a crank and having an axial bore receiving the end of said traversing shaft and having a projecting externally threaded outer portion at the inner side of its crank, an anti-friction bearing for said driving shaft including an inner race member slidable axially on said driving shaft, a friction clutch connection for said driving shaft to said driving gear in thrust transmitting relation to said race member including a thrust member at the inner end of said driving shaft, a member splined to said driving shaft and constituting an opposed thrust member, a driven clutch member having driving engagement with said gear, friction disks coacting with said thrust members and with said driven clutch member, a spring element arranged at the outer side of said ratchet member in operative relation thereto and to said inner ball race member, and a clutch adjusting member threaded upon said driving shaft in operative thrust transmitting relation to said inner ball race member to adjust the friction of said clutch connection.

4. The combination in a fishing reel including a frame, a spool provided with a pinion and a line guide traversing shaft, of a driving gear mounted on said traversing shaft in angularly fixed relation thereto and coacting with said pinion, a driving shaft provided with a crank and having an axial bore receiving the end of said traversing shaft and having a projecting externally threaded outer portion at the inner side of its crank, an anti-friction bearing for said driving shaft including an inner race member slidable axially on said driving shaft, a friction clutch connection for said driving shaft to said driving gear in thrust transmitting relation to said race member including a thrust member at the inner end of said driving shaft, a member splined to said driving shaft and constituting an opposed thrust member, a driven clutch member having driving engagement with said gear, friction disks coacting with said thrust members and with said driven clutch member, and a clutch adjusting member threaded upon said driving shaft in operative thrust transmitting relation to said inner ball race member to adjust the friction of said clutch connection.

5. The combination in a fishing reel including a frame, a spool provided with a pinion and a line guide traversing shaft, of a driving gear mounted on said traversing shaft in angularly fixed relation thereto and coacting with said pinion, a driving shaft provided with a crank and having an axial bore receiving the end of said traversing shaft and having a projecting externally threaded outer portion at the inner side of its crank, a bearing member for said driving shaft slidable axially thereon, a friction clutch connection for said driving shaft to said driving gear in thrust transmitting relation to said race member including a thrust member at the inner end of said driving shaft, a ratchet member splined to said driving shaft and constituting an opposed thrust member, a driven clutch member having driving engagement with said gear, friction disks coacting with said thrust members and with said driven clutch member, a spring element arranged at the outer side of said ratchet member in operative relation thereto and to said bearing member, a manually controlled pawl coacting with said ratchet member, and a clutch adjusting member threaded upon said driving shaft in operative thrust transmitting relation to said bearing member to adjust the friction of said clutch connection.

6. The combination in a fishing reel including a frame, a spool provided with a pinion and a line guide traversing shaft, of a driving gear mounted on said traversing shaft in angularly fixed relation thereto and coacting with said pinion, a driving shaft provided with a crank and having an axial bore receiving the end of said traversing shaft and having a projecting externally threaded outer portion at the inner side of its crank, a bearing member for said driving shaft slidable axially thereon, a friction clutch connection for said driving shaft to said driving gear in thrust transmitting relation to said race member including a thrust member at the inner end of said driving shaft, a member splined to said driving shaft and constituting an opposed thrust member, a driven clutch member having driving engagement with said gear, friction disks coacting with said thrust members and with said driven clutch member, a spring element arranged at the outer side of said splined member in operative thrust transmitting relation thereto and to said bearing member, and a clutch adjusting member threaded upon said driving shaft in operative thrust transmitting relation to said bearing member to adjust the friction of said clutch connection.

7. In a fishing reel having a spool provided with a pinion, means for frictionally driving said spool comprising a gear meshing with said pinion, a member adapted to be positively and manually rotated relative to said gear, ball bearing means for rotatably mounting said member including an inner race slidable axially on said member, a disk rotatably mounted and axially restrained on said member and having portions positively engageable with said gear, a friction member frictionally engaging said disk, a resilient element interposed in thrust transmitting relation between said friction member and said inner race whereby axial adjustment of said inner race controls the friction exerted on said disk by said friction member, and a manually actuatable adjusting member threaded on said first named member and in axial thrust engagement with said inner race to urge the latter axially and compress said resilient element and thereby increase the friction exerted on said disk.

8. The combination with a frame, a spool, a driving gear operatively associated with the spool, a crank-operated driving member having an externally threaded outer portion and a flange at its inner end disposed within said gear and constituting a clutch thrust member, a ball bearing support for said crank operated member including an inner race member slidably mounted on said crank operated member, a friction disk assembly operatively associated with said gear and with said crank operated member and in supported relation to said flange, a dished spring thrust member for said friction disk assembly positioned to be engaged by said inner ball race member, and an adjusting member threaded upon said crank operated member in coacting relation to said inner ball race member whereby said inner ball race member constitutes a thrust member for said friction disk assembly.

9. The combination with a frame, a spool, a driving gear operatively associated with the spool, a crank-operated driving member having an externally threaded outer portion, a ball bearing support for said crank operated member including an inner race member slidably mounted on said crank operated member, a friction disk assembly operatively associated with said gear and with said crank operated member, a spring thrust member for said friction disk assembly positioned to be engaged by said inner ball race member, and an adjusting member threaded upon said crank operated member in coacting relation to said inner ball race member whereby said inner ball race member constitutes a thrust member for said friction disk assembly.

10. The combination with a frame, a spool, a driving gear operatively associated with the spool, a crank-operated driving member having an externally threaded outer portion, a ball bearing support for said crank operated member including an inner race member slidably mounted on said crank operated member, a friction disk assembly operatively associated with said gear and with said crank operated member, and an adjusting member threaded upon said crank operated member in coacting relation to said inner ball race member, said inner ball race member constituting a thrust member for said friction disk assembly.

WILLIAM G. BALZ.
EARLE D. CLICKNER.